United States Patent
Birenbach et al.

(10) Patent No.: US 7,424,563 B2
(45) Date of Patent: Sep. 9, 2008

(54) TWO-LEVEL INTERRUPT SERVICE ROUTINE

(75) Inventors: Michael Egnoah Birenbach, Cary, NC (US); Gregory Lee Brookshire, Cary, NC (US); James Norris Dieffenderfer, Apex, NC (US); Stephen G. Geist, Raleigh, NC (US); Richard Alan Moore, Raleigh, NC (US); Thomas Andrew Sartorius, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 11/361,402

(22) Filed: Feb. 24, 2006

(65) Prior Publication Data

US 2007/0204087 A1 Aug. 30, 2007

(51) Int. Cl.
*G06F 13/26* (2006.01)
(52) U.S. Cl. .................... 710/261; 710/269
(58) Field of Classification Search ......... 710/260–269, 710/58–60, 48–50; 718/100–108
See application file for complete search history.

(56) References Cited

U.S. PATENT DOCUMENTS

| | | | | | |
|---|---|---|---|---|---|
| 5,287,523 | A | * | 2/1994 | Allison et al. | 710/50 |
| 5,790,846 | A | * | 8/1998 | Mealey et al. | 712/244 |
| 5,828,891 | A | * | 10/1998 | Benayoun et al. | 710/269 |
| 5,867,687 | A | * | 2/1999 | Simpson | 710/264 |
| 6,148,361 | A | * | 11/2000 | Carpenter et al. | 710/260 |
| 6,601,122 | B1 | * | 7/2003 | Broberg et al. | 710/266 |
| 6,889,279 | B2 | * | 5/2005 | Godfrey | 710/269 |
| 6,968,411 | B2 | * | 11/2005 | Gaur et al. | 710/260 |
| 6,981,083 | B2 | * | 12/2005 | Arimilli et al. | 710/260 |
| 7,039,739 | B2 | * | 5/2006 | Bonola | 710/262 |
| 7,080,179 | B1 | * | 7/2006 | He et al. | 710/269 |
| 7,117,319 | B2 | * | 10/2006 | Arimilli et al. | 711/156 |
| 2002/0016880 | A1 | * | 2/2002 | Bhagat | 710/261 |
| 2004/0111593 | A1 | | 6/2004 | Arimilli | |

OTHER PUBLICATIONS

ARM PrimeCell Vectored Interrupt Controller (PL192) Technical Reference Manual, [on-line], Dec. 2002, ARM Limited, XP002440849, www.arm.com/pdfs/DDI0273A_VIC_PL192.pdf.
Sloss A.N., Interrupt Handing, [on-line], Apr. 25, 2001, XP002396022, www.13thmonkey.org/documentation/ARM/HAI.pdf.
Reducing Interrupt Latency in Multi-Tasking Operating Systems Running on PC and PC Compatibles/Clones, IBM Technical Disclosure Bulletin, IBM Corp. New York, US, vol. 34, No. 4A, Sep. 1, 1991, pp. 454-455 XP000210970, ISSN: 0018-8689.
Off-Level Interrupt Handling, IBM Technical Disclosure Bulletin, IBM Corp. New York, US, vol. 33, No. 9, Feb. 1, 1991, pp. 484-485, XP000109599, ISSN: 0018-8689.

* cited by examiner

*Primary Examiner*—Raymond N Phan
(74) *Attorney, Agent, or Firm*—Nicholas J. Pauley; John L. Ciccozzi; Thomas Rouse

(57) ABSTRACT

A processor provides two-level interrupt servicing. In one embodiment, the processor comprises a storage device and an interrupt handler. The storage device is configured to store an interrupt identifier corresponding to an interrupt request. The interrupt handler is configured to recognize the interrupt request, initiate a common interrupt service routine responsive to recognizing the interrupt request and subsequently initiate an interrupt service routine corresponding to the stored interrupt identifier.

24 Claims, 3 Drawing Sheets

TWO-LEVEL INTERRUPT SERVICE ROUTINE

FIELD

The present disclosure generally relates to interrupt handling routines, and particularly relates to two-level interrupt handling routines in processors.

BACKGROUND

Computing systems, e.g., servers, desktop computers, and mobile devices such as portable computers, mobile phones, personal digital assistants and the like conventionally include one or more processors, volatile and nonvolatile memory, controllers, and peripheral devices such as a keyboard, keypad, mouse, display, earpiece, etc. The various components of a computing system are interconnected via one or more system and/or peripheral buses over which data, address and/or control information is transferred between peripheral devices and processor(s) included in the system.

When a peripheral device requires servicing, the device may activate an interrupt signal. An interrupt causes the system processor to temporarily halt normal program flow in order to service the interrupt request. Commonly, an interrupt controller prioritizes and processes the various interrupt signals generated by peripheral devices. As such, the interrupt controller functions as an interface between peripheral devices and the system processor. Thus, the system processor is not burdened with low-level tasks associated with managing, prioritizing and scheduling interrupt requests generated by various peripheral devices. Because the system processor does not initially interface directly with peripheral devices when servicing interrupt requests, the processor must be provided an address or other information for identifying an Interrupt Service Routine (ISR) corresponding to a peripheral device requesting servicing. An ISR services interrupts generated by a particular peripheral device. Commonly, multiple ISRs are maintained in memory, each associated with a different peripheral device.

In one conventional approach, an address associated with an ISR is passed to a system processor via a system bus. Particularly, an interrupt controller issues an interrupt request to the system processor. At the appropriate time, the system processor acknowledges the request. Such initial interrupt request and acknowledgment signaling commonly occurs over signal lines running directly between the interrupt controller and the system processor. After acknowledging the interrupt request, the system processor executes a common interrupt handler routine, often referred to as First-Level Interrupt Handler (FLIH) routine, for handling tasks common to all interrupts. For example, FLIH routines may save the status of the interrupted instruction or routine, determine the action required to process a particular interrupt and schedule the execution of device-specific ISRs, commonly referred to as Second-Level Interrupt Handler (SLIH) routines. SLIH routines process interrupts associated with particular peripheral devices. The system processor initiates an SLIH routine by accessing a memory location associated with the address information received from an interrupt controller.

The interrupt controller provides ISR address information to the system processor via the system bus. Transferring ISR address information via the system bus delays the initiation of a particular SLIH routine by the system processor. Depending upon the particular activity occurring within a computing system, the delay associated with acquiring ISR address information via the system bus can be lengthy. For example, if the system processor is reading or writing large amounts of data from memory or is servicing other peripheral devices, access to the system bus for purposes of acquiring address information can be significantly delayed.

A second conventional approach eliminates the delay associated with transferring ISR address information to a system processor via a system bus. Particularly, address information is passed directly to a system processor from an interrupt controller via a dedicated bus. For example, ARM Holdings plc offers a Vectored Interrupt Controller (part number PL192, document reference # ARM DDI 0273A) having a dedicated bus for passing ISR address information from an interrupt controller directly to a system processor. As such, the system processor can initiate corresponding SLIH routines more rapidly.

However, system processors do not conventionally store the ISR address information locally within the processor for subsequent use. Instead, when a conventional processor receives ISR address information from an interrupt controller over a dedicated bus, it immediately initiates a corresponding SLIH routine without first executing a common FLIH routine. That is, the processor immediately jumps to a memory location associated with a particular SLIH routine without executing common FLIH code. Thus, each SLIH routine must contain common first-level interrupt handling code which is duplicative, inefficient, increases the likelihood of errors, and reduces code portability.

SUMMARY OF THE DISCLOSURE

According to the methods and apparatus taught herein, a processor that provides two-level interrupt servicing is presented. In one or more embodiments, the processor comprises a storage device and an interrupt handler. The storage device is configured to store an interrupt identifier corresponding to an interrupt request. The interrupt handler is configured to recognize the interrupt request, initiate a common interrupt service routine responsive to recognizing the interrupt request and subsequently initiate an interrupt service routine corresponding to the stored interrupt identifier.

Thus, in one embodiment, a processor services an interrupt by recognizing an interrupt request, saving an interrupt identifier corresponding to the interrupt request, initiating a common interrupt service routine responsive to recognizing the interrupt request, and subsequently initiating an interrupt service routine corresponding to the saved interrupt identifier.

Corresponding to the above apparatuses and methods in an embodiment of the invention, a complementary computer program product is embodied in a computer readable medium for servicing interrupts by a processor comprises program instructions for recognizing an interrupt request, saving an interrupt identifier corresponding to the interrupt request, initiating a common interrupt service routine responsive to recognizing the interrupt request, and subsequently initiating an interrupt service routine corresponding to the saved interrupt identifier.

Of course, the present disclosure is not limited to the above features. Those skilled in the art will recognize additional features upon reading the following detailed description, and upon viewing the accompanying drawings.

DETAILED DESCRIPTION

Figure 1:
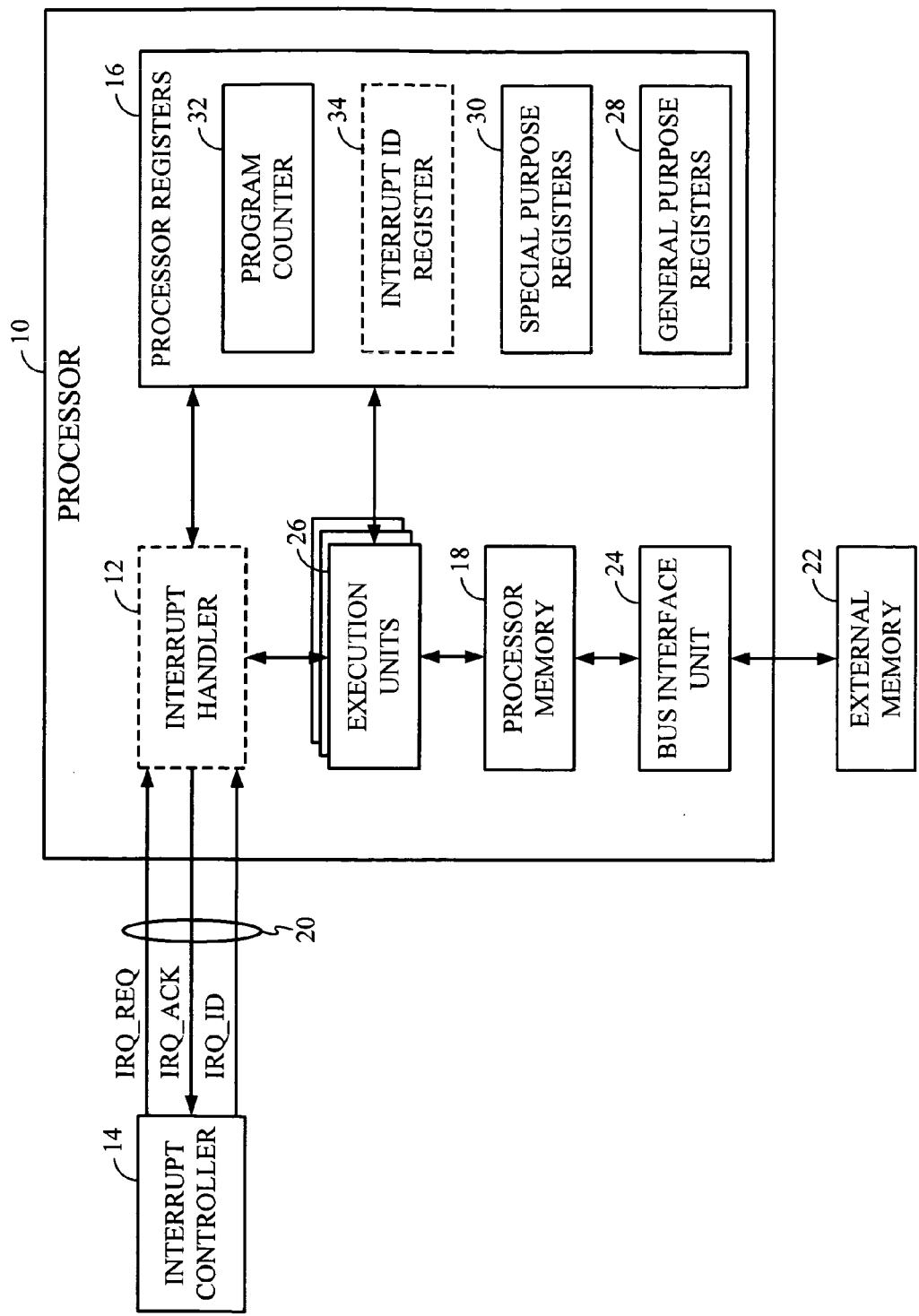
FIG. 1 is a block diagram illustrating an embodiment of a processor including an interrupt handler.

FIG. 1 illustrates an embodiment of a processor 10 including an interrupt handler 12. The processor 10 executes a collection of machine instructions that instruct the processor 10 to take certain actions, including interrupt handling. Particularly, the interrupt handler 12 included in the processor 10 services interrupt requests received by the processor 10. Incident to acknowledging an interrupt request, the interrupt handler 12 receives an interrupt identifier (IRQ_ID) from an interrupt controller 14, i.e., an address or other information associated with a peripheral device (not shown) requesting servicing. The interrupt handler 12 saves the interrupt identifier in the processor 10, e.g., by storing the interrupt identifier in one of several processor registers 16 or in memory 18 included in the processor 10. Responsive to an interrupt request, the processor 10 either finishes or suspends any instruction or part thereof that is currently executing.

When responding to an interrupt request, the interrupt handler 12 executes a common Interrupt Service Routine (ISR), often referred to as First-Level Interrupt Handler (FLIH) routine, for handling tasks common to all interrupts. For example, a common FLIH routine may include one or more of disabling lower priority interrupts, enabling higher priority interrupts for servicing, identifying a cause of the interrupt request, saving information corresponding to a state of the processor 10 onto a stack and scheduling execution of a device-specific ISR. After invoking the FLIH routine, the interrupt handler 12 subsequently initiates a device-specific ISR, commonly referred to as Second-Level Interrupt Handler (SLIH) routine, for processing an interrupt request issued by a particular peripheral device or devices. Because the interrupt identifier is saved in the processor 10, the interrupt handler 12 may begin executing a common FLIH routine first and then subsequently execute a SLIH routine that corresponds to the saved interrupt identifier, thus enabling code associated with common interrupt handling tasks to be contained in a common FLIH routine.

In one example, the processor 10 and the interrupt controller 14 communicate via a dedicated communication channel 20 that directly links the processor 10 and the controller 14. The communication channel 20 includes a link by which the interrupt controller 14 issues prioritized interrupt requests to the processor 10 (IRQ_REQ). The communication channel 20 further includes a link used by the processor 10 to acknowledge interrupt requests (IRQ_ACK) to the interrupt controller 14. The communication channel 20 also includes a link or bus by which an interrupt identifier (IRQ_ID) is transmitted to the processor 10 from the interrupt controller 14. Interrupt request and acknowledgement signals as well as interrupt identifiers may be multiplexed over a reduced number of signal lines. Regardless of how the processor 10 receives an interrupt identifier, the interrupt handler 12 uses an acquired interrupt identifier to subsequently initiate a device-specific SLIH routine after a common FLIH routine has been invoked.

In operation, the processor 10 retrieves instructions and corresponding data from external memory 22. The processor 10 executes the instructions and stores results to the external memory 22. In a non-limiting example, the processor memory 18, e.g., a cache, stores address and data information retrieved from the external memory 22 via a bus interface unit 24. The processor 10 further includes one or more execution units 26 for executing program instructions such as interrupt handling. For example, the execution units 26 may comprises one or more instruction units, completion units, branch units, floating point units, integer units, and load/store units.

The processor 10 also includes registers 16, such as general purpose and special purpose registers 28, 30 for storing contextual data, stack pointers, flags, etc. Stack pointers indicate a zone in the processor memory 18 used for saving contextual data in response to the processor 10 switching context from one program currently being executed to another program, e.g., a zone in the processor memory 18 used for saving contextual data when the processor 10 temporarily halts a program to service an interrupt request. The processor 10 further includes a program counter 32 (also known as an instruction sequencer, an instruction pointer or a task register) for designating the address of the next instruction to be executed. The interrupt handler 12 included in the processor 10 may comprise one or more digital processing circuits, configured according to computer program instructions implemented in software (or firmware). Such circuits may be shared with other processing and control functions associated with the processor 10, e.g., by the execution units 26. Those skilled in the art will appreciate that the processor 10 may comprise a single microprocessor, a multi-core microprocessor, or multiple microprocessors embedded in the same system where one or more of the microprocessors may be pipelined and/or superscalar.

When a peripheral device (not shown) requires servicing, it issues an interrupt request to the interrupt controller 14. The interrupt controller 14 monitors peripheral devices for interrupt requests and prioritizes and processes various interrupt requests received from peripheral devices. The interrupt controller 14 sends a prioritized interrupt request (IRQ_REQ) to the processor 10 to indicate that a peripheral device requests servicing. In addition, the interrupt controller 14 provides to the processor 10 an interrupt identifier (IRQ_ID) associated with the peripheral device requesting interrupt servicing. The interrupt handler 12 included in the processor 10 services interrupt requests received from the interrupt controller 14.

Figure 2:
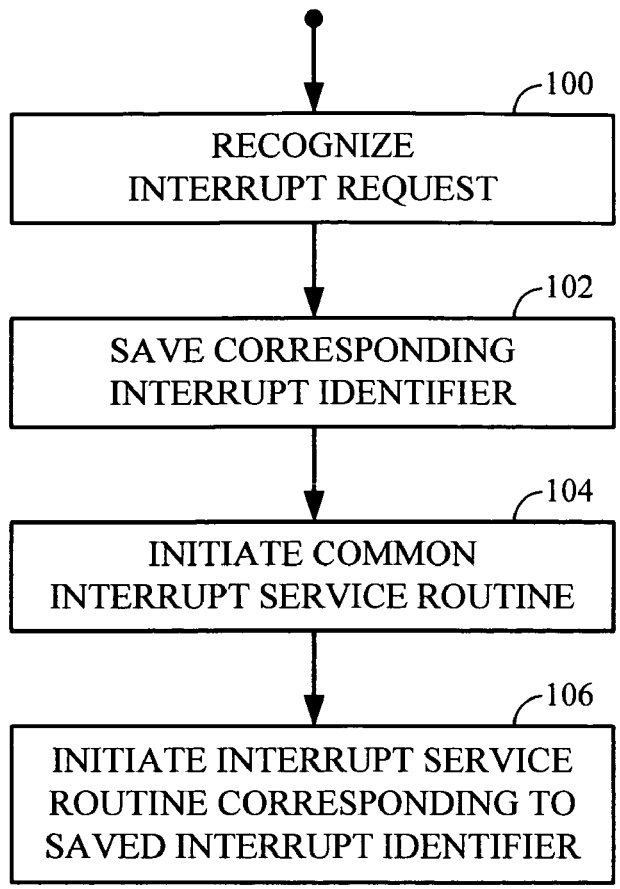
FIG. 2 is a logic flow diagram illustrating an embodiment of program logic for implementing a two-level interrupt service routine by an interrupt handler.

FIG. 2 illustrates program logic for servicing interrupt requests by the interrupt handler 12. Interrupt processing "begins" with the interrupt handler 12 recognizing the interrupt request (Step 100). In one example, the interrupt handler 12 recognizes an interrupt request in response to the interrupt controller 14 issuing an interrupt request (IRQ_REQ) to the processor 10. In turn, the interrupt handler 12 issues an interrupt acknowledgment (IRQ_ACK) when the processor 10 is ready to service the request. In response to the interrupt acknowledgement, the interrupt controller 14 transmits to the processor 10 an interrupt identifier (IRQ_ID) associated with the peripheral device requesting service.

The interrupt handler 12 saves the interrupt identifier in the processor 10 for later use (Step 102). For example, the interrupt identifier may be stored in one of the general or special purpose registers 28, 30 or in the processor memory 18. If saved in one of the general or special purpose registers 28, 30, one register is temporarily allocated for storing the device interrupt identifier. Alternatively, a dedicated register 34 may store the interrupt identifier. Regardless of the storage medium, the saved interrupt identifier is available for later use by the interrupt handler 12 for initiating a SLIH routine tailored to the peripheral device that requested servicing. Because the interrupt identifier is saved in the processor 10, the interrupt handler 12 is not required to immediately jump to the tailored SLIH routine when it begins servicing an interrupt request. Instead, the interrupt handler 12 may first initiate execution of a common FLIH routine before initiating the tailored SLIH routine (Step 104). As such, code associated with common interrupt handling tasks may be contained in a single FLIH routine instead of in each SLIH routine supported by the processor 10, thus minimizing errors, increasing interrupt service performance, and improving code portability.

Figure 3:
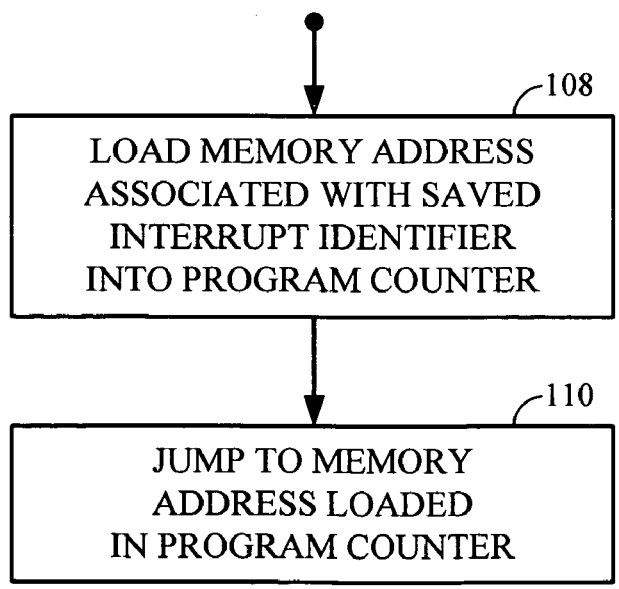
FIG. 3 is a logic flow diagram illustrating an embodiment of program logic for loading a saved interrupt identifier into a program counter.

After the common FLIH routine has been invoked, the interrupt handler 12 subsequently initiates the tailored SLIH routine by causing the processor 10 to jump to a memory address at which the tailored SLIH routine is maintained (Step 106). In one example, the saved interrupt identifier comprises an address at which the tailored SLIH routine is maintained in the external memory 22 or in the processor memory 18. As such, the interrupt handler 12 loads the interrupt identifier into the program counter 32 as illustrated by Step 108 of FIG. 3, e.g., by issuing an instruction that loads the program counter 32 with the interrupt identifier. In some cases, the interrupt identifier may require address translation so that the program counter 32 is loaded with address information of the proper form. Regardless, the processor 10 then jumps to the memory address associated with the interrupt identifier loaded in the program counter 32 as illustrated by Step 110 of FIG. 3.

Figure 4:
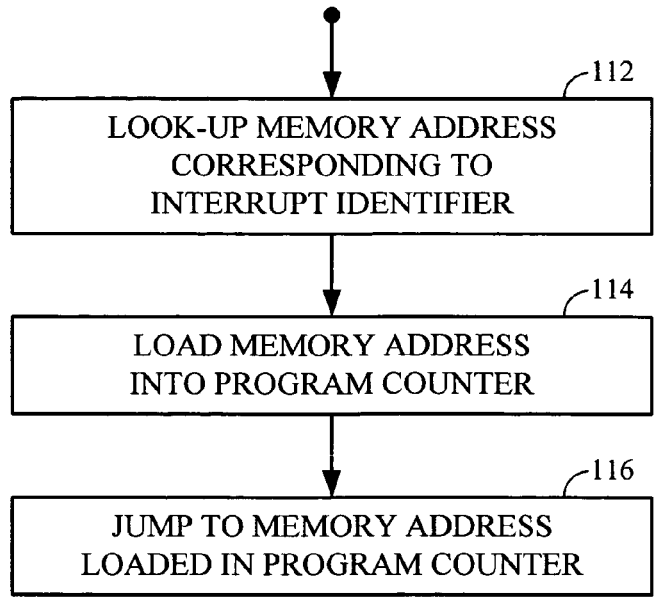
FIG. 4 is a logic flow diagram illustrating another embodiment of program logic for loading a saved interrupt identifier into a program counter.

In another example, the saved interrupt identifier comprises other information uniquely identifying the peripheral device requesting service. As such, the interrupt handler 12 uses the saved interrupt identifier to look-up in the processor memory 18 or the external memory 22, e.g., in a lookup table, a memory address corresponding to the interrupt identifier as illustrated by Step 112 of FIG. 4. The interrupt handler 12 then initiates the tailored SLIH routine by loading the program counter 32 with the acquired memory address as illustrated by Step 114 of FIG. 4. The processor 10 then jumps to the memory address loaded in the program counter 32 as illustrated by Step 116 of FIG. 4. Regardless of the content of an interrupt identifier, the interrupt handler 12 may delete a stored interrupt identifier from the processor 10 once the stored interrupt identifier has been used to initiate a corresponding SLIH routine.

Figure 5:
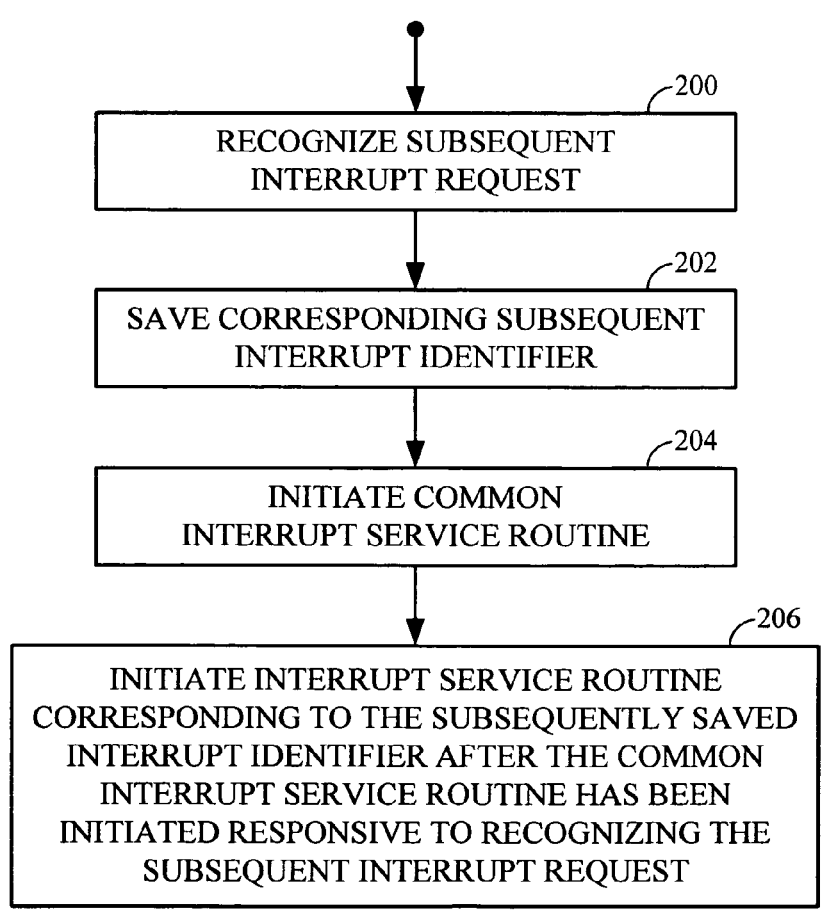
FIG. 5 is a logic flow diagram illustrating another embodiment of program logic for implementing a two-level interrupt service routine by an interrupt handler.

FIG. 5 illustrates program logic for servicing subsequent interrupt requests received by the processor 10 while the interrupt handler 12 is servicing a prior interrupt request, e.g. a nested interrupt request. Processing "begins" with the interrupt handler 12 recognizing a subsequent interrupt request while the interrupt handler 12 is servicing a prior interrupt request (Step 200). As part of the interrupt request/acknowledgment process, the processor 10 receives from the interrupt controller 14 an interrupt identifier associated with the peripheral device subsequently requesting servicing. The interrupt handler 12 saves the interrupt identifier in the processor 10 for later use (Step 202). In a non-limiting example, the subsequent interrupt identifier is saved by overwriting the stored interrupt identifier corresponding to the prior interrupt request with the interrupt identifier corresponding to the subsequent interrupt request.

The interrupt handler 12 first commences execution of a common FLIH routine before initiating a SLIH routine tailored to the newly-saved interrupt identifier (Step 204). In one embodiment, e.g., when the subsequent interrupt request is of a higher priority than the prior interrupt request, the interrupt handler 12 suspends the SLIH routine associated with the prior interrupt request and initiates the common FLIH routine. In another embodiment, e.g., when the subsequent interrupt request is of the same or lower priority as the prior interrupt request, the interrupt handler 12 allows the SLIH routine associated with the prior interrupt request to complete execution before initiating the common FLIH routine.

Regardless, after the common FLIH routine has been invoked responsive to the subsequent interrupt request, the interrupt handler 12 then initiates the SLIH routine associated with the newly stored interrupt identifier by causing the processor 10 to jump to a memory address at which the tailored SLIH routine is maintained (Step 206). In one example, the newly-saved interrupt identifier comprises an address at which the tailored SLIH routine is maintained in the external memory 22 or in the processor memory 18. In another example, the newly-saved interrupt identifier comprises other information uniquely identifying the peripheral device requesting service. Regardless, the interrupt handler 12 uses the newly-saved interrupt identifier to initiate the corresponding SLIH routine as previously described.

With the above range of variations and applications in mind, it should be understood that the present disclosure is not limited by the foregoing description, nor is it limited by the accompanying drawings. Instead, the present disclosure is limited only by the following claims and their legal equivalents.

What is claimed is:

1. A method of servicing interrupts by a processor, comprising:
    recognizing an interrupt request;
    saving an interrupt identifier corresponding to the interrupt request;
    initiating a common interrupt service routine responsive to recognizing the interrupt request; and
    subsequently initiating an interrupt service routine corresponding to the saved interrupt identifier, wherein subsequently initiating the interrupt service routine corresponding to the saved interrupt identifier comprises subsequently jumping to a memory address associated with the saved interrupt identifier, wherein subsequently jumping to the memory address associated with the saved interrupt identifier comprises:
        subsequently loading the memory address associated with the saved interrupt identifier into a program counter of the processor; and
        jumping to the memory address loaded in the program counter.

2. The method of claim 1, wherein saving the interrupt identifier comprises saving the interrupt identifier in a register included in the processor.

3. The method of claim 1, wherein initiating the common interrupt service routine comprises initiating at least one of scheduling execution of the interrupt request, disabling lower priority interrupts, enabling higher priority interrupts for servicing, identifying a cause of the interrupt request, and saving information corresponding to a state of the processor responsive to recognizing the interrupt request.

4. The method of claim 1, wherein subsequently loading the memory address associated with the saved interrupt identifier into the program counter comprises:
    subsequently using the saved interrupt identifier to look-up the memory address; and
    loading the memory address into the program counter.

5. The method of claim 1, wherein subsequently loading the memory address associated with the saved interrupt identifier into the program counter comprises loading the saved interrupt identifier into the program counter.

6. The method of claim 1, further comprising deleting the saved interrupt identifier after the interrupt service routine corresponding to the saved interrupt identifier has been initiated.

7. The method of claim 1, further comprising:
recognizing a subsequent interrupt request;
saving an interrupt identifier corresponding to the subsequent interrupt request;
initiating the common interrupt service routine responsive to recognizing the subsequent interrupt request; and
initiating an interrupt service routine corresponding to the subsequently saved interrupt identifier after the common interrupt service routine has been initiated responsive to recognizing the subsequent interrupt request.

8. The method of claim 7, wherein initiating the common interrupt service routine responsive to recognizing the subsequent interrupt request comprises initiating the common interrupt service routine after the prior interrupt service routine has completed.

9. The method of claim 7, wherein saving the subsequent interrupt identifier comprises overwriting the saved interrupt identifier corresponding to the prior interrupt request with the interrupt identifier corresponding to the subsequent interrupt request.

10. A processor, comprising:
a storage device configured to store an interrupt identifier corresponding to an interrupt request; and
an interrupt handler configured to recognize the interrupt request, initiate a common interrupt service routine responsive to recognizing the interrupt request and subsequently initiate an interrupt service routine corresponding to the stored interrupt identifier, wherein the interrupt handler is configured to subsequently jump to the memory address associated with the saved interrupt identifier by subsequently loading the memory address associated with the saved interrupt identifier into a program counter of the processor and jumping to the memory address loaded in the program counter.

11. The processor of claim 10, wherein the storage device comprises a register included in the processor.

12. The processor of claim 10, wherein the interrupt handler is configured to initiate the common interrupt service routine by initiating at least one of scheduling execution of the interrupt request, disabling lower priority interrupts, enabling higher priority interrupts for servicing, identifying a cause of the interrupt request, and saving information corresponding to a state of the processor responsive to recognizing the interrupt request.

13. The processor of claim 10, wherein the interrupt handler is configured to subsequently initiate the interrupt service routine corresponding to the stored interrupt identifier by subsequently jumping to a memory address associated with the stored interrupt identifier.

14. The processor of claim 10, wherein the interrupt handler is configured to subsequently load the memory address associated with the saved interrupt identifier into the program counter by subsequently using the saved interrupt identifier to look-up the memory address and loading the memory address into the program counter.

15. The processor of claim 10, wherein the interrupt handler is configured to subsequently load the memory address associated with the saved interrupt identifier into the program counter by loading the saved interrupt identifier into the program counter.

16. The processor of claim 10, wherein the interrupt handler is further configured to delete the stored interrupt identifier after the interrupt service routine corresponding to the stored interrupt identifier has been initiated.

17. The processor of claim 10, wherein the storage device is farther configured to store an interrupt identifier corresponding to a subsequent interrupt request and the interrupt handler is further configured to recognize the subsequent interrupt request, initiate the common interrupt service routine responsive to recognizing the subsequent interrupt request and initiate an interrupt service routine corresponding to the subsequently saved interrupt identifier after the common interrupt service routine has been initiated responsive to recognizing the subsequent interrupt request.

18. The processor of claim 17, wherein the interrupt handler is configured to initiate the common interrupt service routine responsive to recognizing the subsequent interrupt request by initiating the common interrupt service routine after the prior interrupt service routine has completed.

19. The processor of claim 17, wherein the storage device is configured to store the subsequent interrupt identifier by overwriting the stored interrupt identifier corresponding to the prior interrupt request with the interrupt identifier corresponding to the subsequent interrupt request.

20. A computer program product embodied in a computer readable medium for servicing interrupts by a processor, comprising:
program instructions for recognizing an interrupt request;
program instructions for saving an interrupt identifier corresponding to the interrupt request;
program instructions for initiating a common interrupt service routine responsive to recognizing the interrupt request; and
program instructions for subsequently initiating an interrupt service routine corresponding to the saved interrupt identifier, wherein the program instructions for subsequently initiating the interrupt service routine corresponding to the saved interrupt identifier comprise program instructions for subsequently jumping to a memory address associated with the saved interrupt identifier, wherein the program instructions for subsequently jumping to the memory address associated with the saved interrupt identifier comprise:
program instructions for subsequently loading the memory address associated with the saved interrupt identifier into a program counter of the processor; and
program instructions for jumping to the memory address loaded in the program counter.

21. The computer program product of claim 20, wherein the program instructions for subsequently loading the memory address associated with the saved interrupt identifier into the program counter comprise:
program instructions for subsequently using the saved interrupt identifier to look-up the memory address; and
program instructions for loading the memory address into the program counter.

22. The computer program product of claim 20, wherein the program instructions for subsequently loading the memory address associated with the saved interrupt identifier into the program counter comprise program instructions for loading the saved interrupt identifier into the program counter.

23. The computer program product of claim 20, further comprising program instructions for deleting the saved interrupt identifier after the interrupt service routine corresponding to the saved interrupt identifier has been initiated.

24. The computer program product of claim 20, further comprising:

program instructions for recognizing a subsequent interrupt request;

program instructions for saving an interrupt identifier corresponding to the subsequent interrupt request;

program instructions for initiating the common interrupt service routine responsive to recognizing the subsequent interrupt request; and program instructions for initiating an interrupt service routine corresponding to the subsequently saved interrupt identifier after the common interrupt service routine has been initiated responsive to recognizing the subsequent interrupt request.

\* \* \* \* \*